United States Patent
Kumar et al.

(10) Patent No.: US 12,544,519 B2
(45) Date of Patent: Feb. 10, 2026

(54) TAMPER EVIDENT SYRINGE AND CAP

(71) Applicant: Becton, Dickinson and Company, Franklin Lakes, NJ (US)

(72) Inventors: Praveen Kumar, Arachalur (IN); Radhika Dharmadhikari, Pune (IN)

(73) Assignee: Becton, Dickinson and Company, Franklin Lakes, NJ (US)

( * ) Notice: Subject to any disclaimer, the term of this patent is extended or adjusted under 35 U.S.C. 154(b) by 589 days.

(21) Appl. No.: 18/100,058

(22) Filed: Jan. 23, 2023

(65) Prior Publication Data
US 2024/0245870 A1 Jul. 25, 2024

(51) Int. Cl.
*A61M 5/50* (2006.01)
*A61M 5/31* (2006.01)
*A61M 5/32* (2006.01)

(52) U.S. Cl.
CPC ........ *A61M 5/5086* (2013.01); *A61M 5/3129* (2013.01); *A61M 5/3134* (2013.01); *A61M 5/3202* (2013.01); *A61M 2005/3104* (2013.01); *A61M 2005/312* (2013.01); *A61M 2005/3142* (2013.01)

(58) Field of Classification Search
CPC .............. A61M 5/5086; A61M 5/3129; A61M 5/3134; A61M 5/3202; A61M 2005/3104; A61M 2005/312; A61M 2005/3142
See application file for complete search history.

(56) References Cited

U.S. PATENT DOCUMENTS

| | | | |
|---|---|---|---|
| 2004/0232149 A1 | 11/2004 | Chmela | |
| 2015/0045744 A1 | 2/2015 | Gupta et al. | |
| 2021/0236744 A1 | 8/2021 | Murray et al. | |
| 2022/0355037 A1* | 11/2022 | Rivier | A61M 5/3134 |

FOREIGN PATENT DOCUMENTS

| | | |
|---|---|---|
| CN | 209933702 U | 1/2020 |
| EP | 1556280 A2 | 7/2005 |
| EP | 1930248 A1 | 6/2008 |
| EP | 1870055 B1 | 11/2019 |
| WO | 2022234422 A1 | 11/2022 |

OTHER PUBLICATIONS

"PCT International Search Report and Written Opinion in PCT/US2024/012130 dated May 27, 2024, 24 pages".

* cited by examiner

*Primary Examiner* — Tasnim Mehjabin Ahmed
(74) *Attorney, Agent, or Firm* — SERVILLA WHITNEY LLC

(57) ABSTRACT

A syringe that includes an adapter section and a barrel having a chamber that holds a fluid. The adapter section includes outer and inner walls that form a first groove. The inner wall includes barrel threads and the outer wall includes a first projection. A cap having cap threads engages the barrel threads to removably attach the cap to the adapter section. A locking element having a sidewall that includes a second projection is received in the first groove and removably attached to the cap by an interference fit. Rotation of the cap causes upward movement of the cap that overcomes the interference fit thereby removing the cap. The locking element is prevented from being removed from the first groove due to contact between the first and second projections. Presence of the locking element in the first groove after the cap is removed provides evidence of tampering.

20 Claims, 9 Drawing Sheets

TAMPER EVIDENT SYRINGE AND CAP

TECHNICAL FIELD

The present disclosure generally relates to a syringe that provides evidence of tampering, and more particularly, to a syringe that includes an adapter section having outer and inner walls that form a first groove wherein the inner wall threadably engages a cap and the outer wall includes a first projection that contacts a second projection of a locking element residing in the first groove wherein the locking element and the cap form an interference fit and removal of the cap causes upward movement of the cap that overcomes the interference fit thereby removing the cap and wherein the locking element is prevented from being removed from the first groove due to the contact between the first and second projections and wherein presence of the locking element in the first groove after the cap is removed provides evidence of tampering.

BACKGROUND

Conventional hypodermic syringes are used in connection with a vial of a medication or fluid wherein the user draws the fluid from a vial into the syringe prior to injection and delivery of the fluid to the patient. For example, the fluid may be a medicine, saline or a constituent of a medical treatment that is designed to be mixed with another constituent prior to administration to the patient.

Syringes may also be packaged as pre-filled devices wherein the syringe is pre-filled with fluid prior to being packaged and shipped to an end user such as a clinician, nurse or other health care provider. It is important that the content of the syringe remain in the syringe prior to administration and that the contents remain sterile and unadulterated prior to their desired administration. It is also important that health care providers and patients be able to determine whether any tampering with the syringe or the material contained therein has occurred. However, existing technology for detecting tampering is cumbersome and difficult to use and may be ineffective in maintain sterility of the syringe contents and the syringe itself.

SUMMARY

In one or more embodiments, a syringe that provides evidence of tampering is disclosed. The syringe includes a syringe barrel having a chamber that holds a fluid. The syringe also includes an adapter section formed on the syringe barrel wherein the adapter section includes outer and inner walls that form a first groove. The inner wall includes barrel threads and the outer wall includes a first projection wherein the adapter section further includes a fluid passageway that enables fluid communication with the chamber. The syringe further includes a moveable plunger having a plunger flange that moves forward within the chamber to decrease a volume of the chamber to cause the fluid to be forced out of the fluid passageway. Additionally, a cap having cap threads threadably engages the barrel threads to removably attach the cap to the adapter section, wherein the cap encloses the fluid passageway and wherein the cap further includes a second groove. The syringe also includes a locking element having a sidewall that includes a second projection, wherein the locking element is received by the first groove and wherein the locking element is removably attached to the cap by an interference fit between the sidewall and the second groove. In addition, rotation of the cap causes upward movement of the cap that overcomes the interference fit between the cap and locking element thereby removing the cap from the adapter section wherein the locking element is prevented from being removed from the first groove due to contact between the first and second projections wherein presence of the locking element in the first groove after the cap is removed provides evidence of tampering.

A method of detecting tampering of a syringe is also disclosed. The method includes providing a syringe barrel having a chamber that holds a fluid and providing an adapter section on the syringe barrel, the adapter section including outer and inner walls that form a first groove wherein the inner wall includes barrel threads and the outer wall includes a first projection and the adapter section further including a fluid passageway that enables fluid communication with the chamber. The method also includes providing a moveable plunger having a plunger flange that moves forward within the chamber to decrease a volume of the chamber to cause the fluid to be forced out of the fluid passageway and providing a cap having cap threads that threadably engage the barrel threads to removably attach the cap to the adapter section wherein the cap encloses the fluid passageway and wherein the cap further includes a second groove. In addition, the method includes providing a locking element having a sidewall that includes a second projection, wherein the locking element is received by the first groove and forming an interference fit between the sidewall and the second groove to removably attached the cap. Further, the method includes providing upward movement of the cap to overcome the interference fit between the cap and locking element thereby removing the cap from the adapter section, providing contact between the first and second projections during upward movement of the cap and inhibiting removal of the locking element from the first groove due to contact between the first and second projections wherein presence of the locking element in the first groove after the cap is removed provides evidence of tampering.

In an embodiment, the locking element is ring shaped.

In one or more embodiments, the first and second projections are wedge shaped.

In an embodiment, the adapter section is transparent to enhance visibility of the locking element.

In one or more embodiments, the outer wall of the adapter section is fabricated from a resilient material.

In one or more embodiments, the cap includes a shoulder section located between an upwardly extending grip section and a downwardly extending attachment section, wherein the shoulder section includes the second groove and the attachment section includes the cap threads.

In one or more embodiments, the cap threads are configured as external threads formed on the attachment section.

In one or more embodiments, the barrel threads are configured as internal threads formed on the inner wall of the adapter section.

In an embodiment, the cap includes internal walls that define a cavity that encloses the fluid passageway.

In one or more embodiments, the fluid is a medicine, saline or a constituent of a medical treatment that is designed to be mixed with another constituent prior to administration to a patient.

In one or more embodiments, a depth of the first groove is larger than a height of the locking element such that the locking element does not extend beyond the first groove to inhibit re-insertion of the locking element back into the first groove after the cap is removed.

DETAILED DESCRIPTION

Before describing several exemplary embodiments of the disclosure, it is to be understood that the disclosure is not limited to the details of construction or process steps set forth in the following description. The disclosure is capable of other embodiments and of being practiced or being carried out in various ways.

Embodiments of the present disclosure pertain to a multi-layer disinfection device for disinfecting a female medical connector. The device includes inner and outer housings that are threadably engaged. In particular, the inner housing includes a flange and first internal threads that engage first external threads of the medical connector. The device also includes an outer housing having second internal threads formed on a housing outer surface that engage second external threads of the inner housing. The outer housing also includes an absorbent material having a disinfectant or antimicrobial agent. Rotation of the outer housing provides frictional engagement between the absorbent material and the medical connector and moves the outer housing toward the inner housing. The second internal and second external threads are configured to provide sufficient scrubbing time and scrubbing rotations by the absorbent material to disinfect the medical connector. In one or more embodiments, the outer housing further includes at least one resilient snap element that moves to an extended position after contact with the flange to indicate that disinfection of the medical connector is complete.

With respect to terms used in this disclosure, the following definitions are provided.

As used herein, the use of "a," "an," and "the" includes the singular and plural.

As used herein, the term "Luer connector" refers to a connection collar that is the standard way of attaching syringes, catheters, hubbed needles, IV tubes, etc. to each other. The Luer connector consists of male and female interlocking tubes, slightly tapered to hold together better with even just a simple pressure/twist fit. Luer connectors can optionally include an additional outer rim of threading, allowing them to be more secure. The Luer connector male end is generally associated with a flush syringe and can interlock and connect to the female end located on the vascular access device (VAD). A Luer connector comprises a distal end, a proximal end, an irregularly shaped outer wall, a profiled center passageway for fluid communication from the chamber of the barrel of a syringe to the hub of a VAD. A Luer connector also has a distal end channel that releasably attaches the Luer connector to the hub of a VAD, and a proximal end channel that releasably attaches the Luer connector to the barrel of a syringe.

Figure 1:
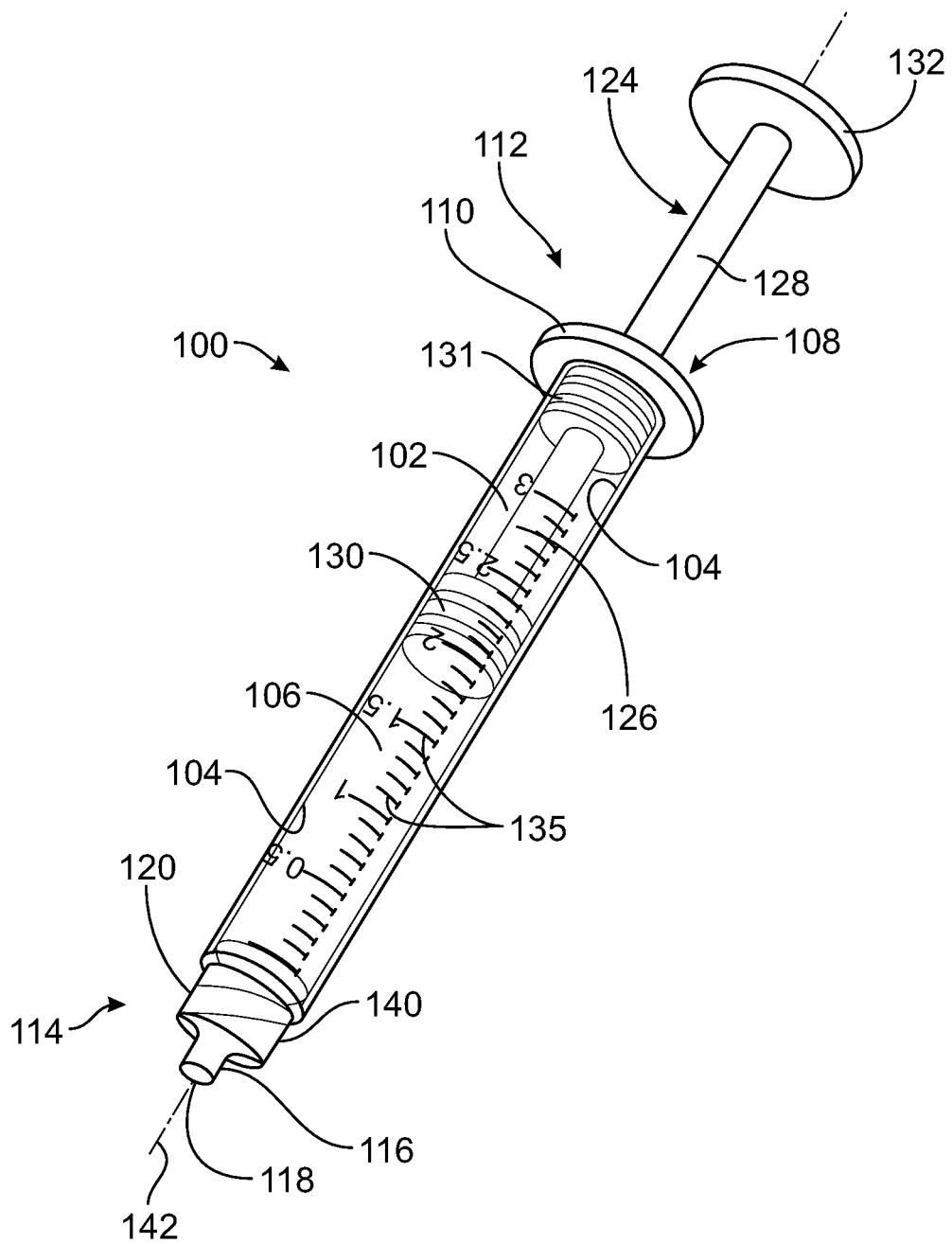
FIG. 1 illustrates a syringe that provides evidence of tampering in accordance with an embodiment of the present disclosure.

FIG. 1 illustrates a syringe 100 located on a central axis 142 and having a barrel 102 that includes an inner surface 104 that defines an interior chamber 106 for receiving a fluid. For example, the fluid may be a medicine, saline or a constituent of a medical treatment that is designed to be mixed with another constituent prior to administration to the patient. The barrel 102 includes an open end 108 and a barrel flange 110 located at a first end 112 of the barrel 102. A second end 114 of the barrel 102 opposite the first end 112 includes a barrel adapter section 140 having an extended barrel tip 116. The barrel tip 116 includes a fluid passageway 118 that enables fluid communication between the chamber 106 and a needle or other dispensing device that is removably attached to the adapter section 140. The adapter section 140 includes an outer wall 120 and may include a Luer connector to enable removable attachment of a medical implement or device to the adapter section 140. In an embodiment, the barrel 102 is substantially transparent.

The syringe 100 further includes moveable plunger 124 having a first portion 126 that extends into the chamber 106 and a second portion 128 that extends from the chamber 106 via the open end 108 of the barrel 102. The plunger 124 includes a first sealing flange 130 that seals against the inner surface 104 of the barrel 102. The plunger 124 may also include a second sealing flange 131 near the open end 108 to enhance sealing against the inner surface 104.

The second portion 128 includes a plunger flange 132 that facilitates gripping of the plunger 124 by a user to enable in and out movement of the plunger 124 relative to the barrel 102. In one or more embodiments, the chamber 106 may be pre-filled with fluid prior to being packaged and shipped to an end user such as a clinician, nurse or other health care provider. Further, the barrel 102 may include markings, such as graduations 135 that provide an indication as to the level or amount of fluid contained within the barrel 102. In operation, fluid is dispensed from the chamber 106 by applying force against the plunger flange 132 so as to move the plunger 124 forward within the chamber 106, resulting in a decrease in the volume of the chamber 106 and causing the fluid to be forced into and out of the barrel tip 116.

Figure 2:
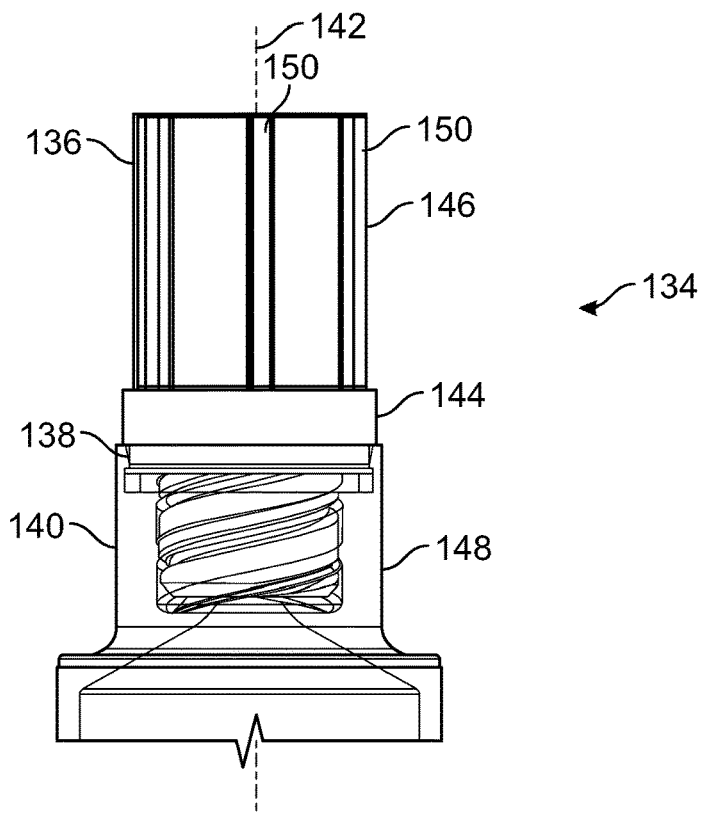
FIG. 2 is a side view of a tamper evident cap assembly in accordance with an embodiment of the present disclosure.

Referring to FIG. 2, a side view is shown of a tamper evident cap assembly 134 for the syringe 100 in accordance with an embodiment of the present disclosure. The cap assembly 134 includes a cap 136, locking element 138 and the adapter section 140 (including the fluid passageway 118) which are arranged on the center axis 142. The cap 136 includes a shoulder section 144 located between an upwardly extending grip section 146 and a downwardly extending attachment section 148. The locking element 138 is located between the shoulder section 144 and the adapter section 140 (see also FIG. 6). In accordance with the present disclosure, the locking element 138 is used to indicate that the cap 136 was previously removed as will be described. The grip section 146 includes a plurality of raised ribs 150 to facilitate gripping of the cap 136 by a user when rotating the cap 136.

Figure 3:
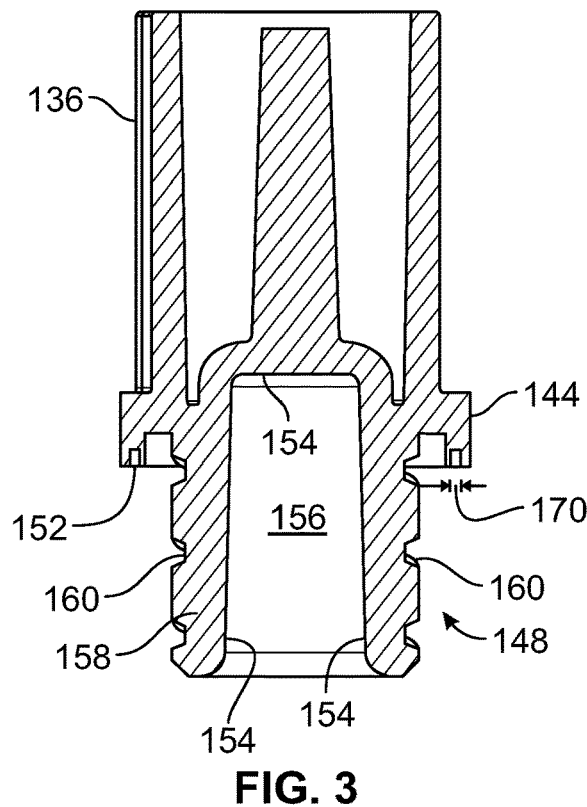
FIG. 3, is a cross sectional view of a cap.

Referring to FIG. 3, a cross sectional view of the cap 136 is shown. The shoulder section 144 includes a first circumferential groove 152 that receives the locking element 138. The attachment section 148 includes internal walls 154 that define a cavity 156 that receives a portion of the barrel tip 116. The attachment section 148 also includes an outer surface 158 having external threads 160 that threadably engage the internal threads 122 (see FIG. 5) of the adapter section 140. The internal walls 154 of the cap 136 enclose the barrel tip 116 and thus isolate or close off a portion of the barrel tip 116 and fluid passageway 118 from the environment so that they remain sterile and unadulterated prior to their desired administration. This enables the syringe 100 to be pre-filled, stored and/or transported with a predetermined amount of fluid disposed within the chamber 106.

Figure 4:
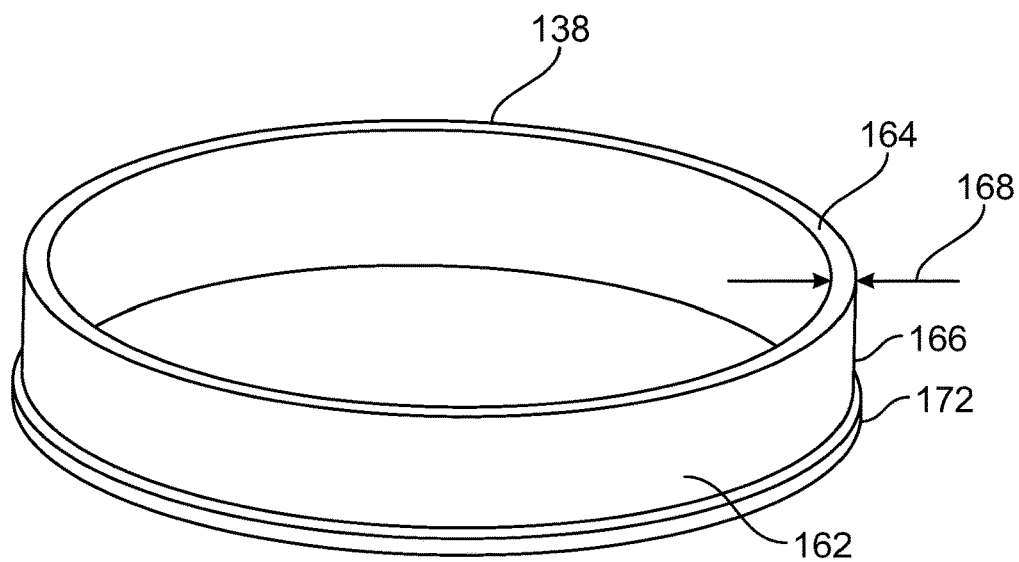
FIG. 4 is a side view of a ring-shaped locking element.

Referring to FIG. 4, a side view of locking element 138 is shown. In one or more embodiments, the locking element 138 has an annular or ring shaped section 164 and includes a sidewall 166. A thickness 168 of the sidewall 166 and a width 170 (see FIG. 3) of the first groove 152 are sized such that an interference fit is formed between the first groove 152 and the sidewall 166 when the sidewall 166 is inserted into the first groove 152 to removably attach the locking element 138 in the first groove 152 by a friction force. A lower portion of the sidewall 166 includes at least one first projection 172 that extends outward from an outer surface 162 of the sidewall 166. In one or move embodiments, the first projection 172 includes a first wide section 174 at the lower portion of the sidewall 166 and a first tapered section 176 to form a substantially first wedge shape (see FIG. 7).

Figure 5:
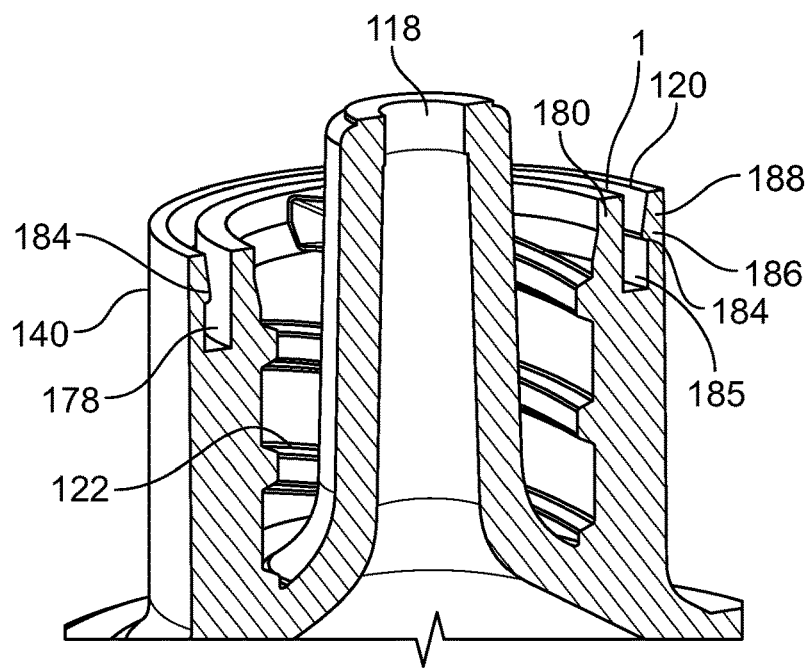
FIG. 5 is a cross sectional view of an adapter section for the syringe.

Referring to FIG. 5, a cross sectional view of the adapter section 140 is shown. The adapter section 140 includes an inner wall 180 that is spaced apart from the outer wall 120 to form a second circumferential groove 178. The inner wall 180 includes internal threads 122 that threadably engage the external threads 160. An inner surface 185 of the outer wall 120 includes at least one second projection 184 (see also FIG. 7) that extends outward from the outer wall 120 toward the locking element 138. In one or move embodiments, the second projection 184 includes a second wide section 186 at the upper portion of the outer wall 120 and a second tapered section 188 to form a substantially second wedge shape. Further, the outer wall 120 and second projection 184 are fabricated from a resilient material. Alternatively, the first projection 172 of the locking element 138 is located on an inner surface of the sidewall 166 and the second projection 184 is located on an outer surface of the inner wall 180.

Figure 6:
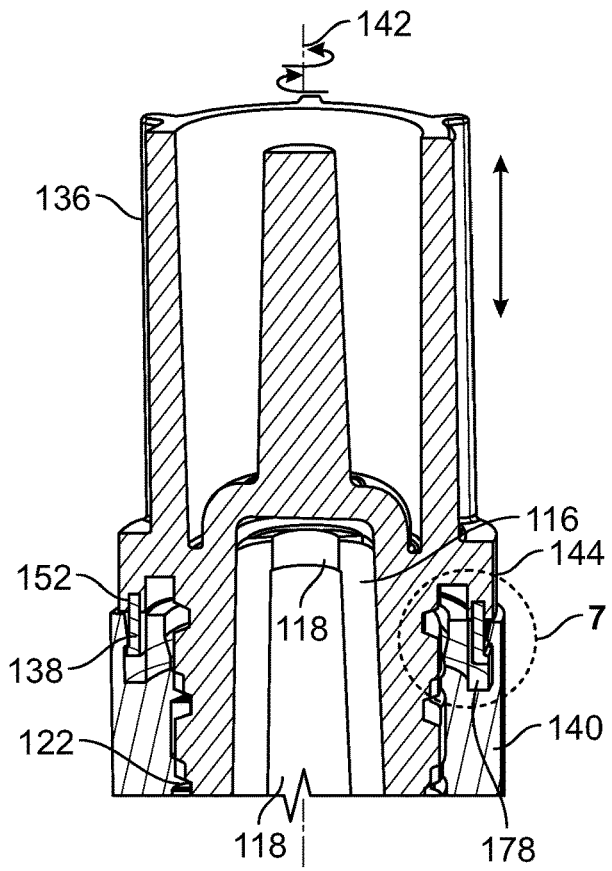
FIG. 6 is a cross sectional view of the cap assembled to the adapter section.
Figure 7:
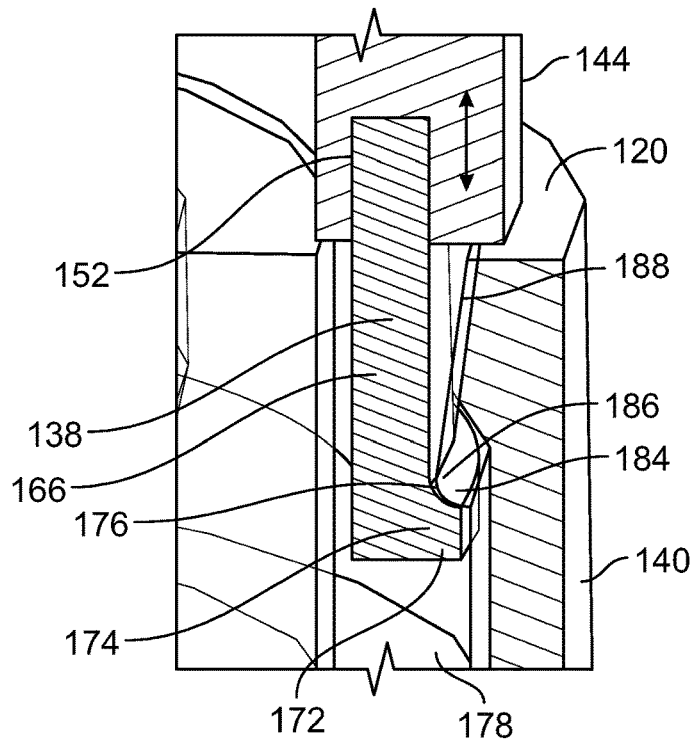
FIG. 7 is an enlarged view of balloon section 7 of FIG. 6 and depicts a shoulder section of the cap, the locking element, a first groove, first and second projections and the adapter section.

FIG. 6 is a cross sectional view of the cap 136 assembled to the adapter section 140. FIG. 7 is an enlarged view of balloon section 7 of FIG. 6 and depicts the shoulder section 144 of the cap 136, locking element 138, first groove 152, first projection 172, second projection 184 and adapter section 140. In order to removably attach the cap 136 to the locking element 138, the sidewall 166 of the locking element 138 is inserted into the first groove 152 to form an interference fit configured to enable removable attachment of the cap 136 to the locking element 138. In addition, the interference fit provides sufficient strength to withstand vibration during shipment of the syringe 100 thus not affecting performance of the locking element 138.

The cap 136 is then removably attached to the adapter section 140 by rotating or screwing the cap 136 in a first direction to threadably engage the external 160 and internal 122 threads. This causes downward movement of the cap 136 and moves the first projection 172 downward toward the second projection 184. In accordance with an aspect of present disclosure, the first projection 172 is configured to contact or interfere with the second projection 184. Prior to contact between the first 172 and second 184 projections, the second projection 184 is in a non-deflected position (i.e., a first position). Continued downward movement of the cap 136 as the cap 136 is rotated causes engagement of the first projection 172 with the second projection 184. This in turn causes outward movement of the outer wall 120 and second projection 184 relative to the center axis 142 to a deflected position that provides clearance for the first projection 172 relative to the second projection 184. Upon further downward movement of the cap 136, the first projection 172 moves downward past the second projection 184 until the first 172 and second 184 projections are no longer engaged. When this occurs, the second projection 184 and outer wall 120 return, or snap back, to the first position. In the first position, the first projection 172 is again configured to interfere with the second projection 184 such that the first projection 172 abuts the second projection 184 to stop or prevent upward movement of the locking element 138 due to the contact between the first 172 and second 184 projections.

In order to access the adapter section 140, a healthcare provider unscrews the cap 136 by rotating the cap 136 in a second direction opposite the first direction, thus moving the cap 136 upward. Due to contact between the first 172 and second 184 projections, upward movement of the locking element 138 is prevented. Thus, the locking element 138 remains in the second groove 178 as the cap 136 moves upward. Upward movement of the cap 136 also generates an upward force that overcomes the friction force due to the interference fit between the first groove 152 and the sidewall 166, thus removing or separating the cap 136 from the locking element 138 while the locking element 138 remains in the second groove 178 of the adapter section 140 due to contact between the first 172 and second 184 projections.

In accordance with the present disclosure, a syringe 100 that includes the locking element 138 in the adapter section 140, but is without a cap 136, indicates that tampering of the syringe 100 or cap 136 previously occurred. Thus, sterility of the syringe 100 and its contents cannot be verified. For example, a syringe 100 that includes the locking element 138 but does not have a cap 136 may indicate that the cap 136 was previously removed by a previous user and that the syringe 100 has been used. In one or more embodiments, the adapter section 140 is substantially transparent to aid visibility of the locking element 138. Further, the locking element 138 may be brightly colored or have indicia to provided added visibility when located in the adapter section 140.

Figure 8:
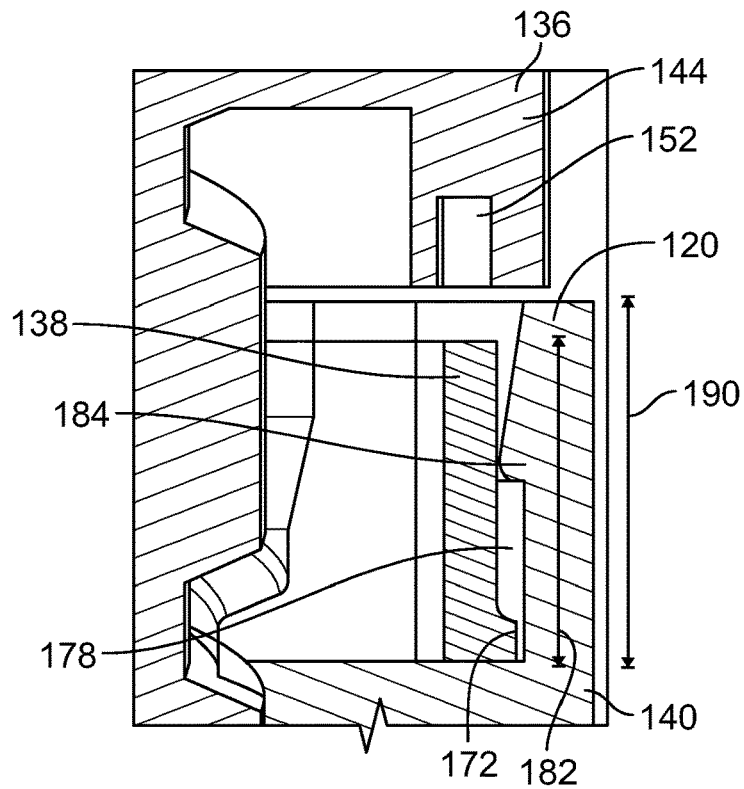
FIG. 8 is a cross sectional view of the cap after being separated from the locking element.
Figure 9:
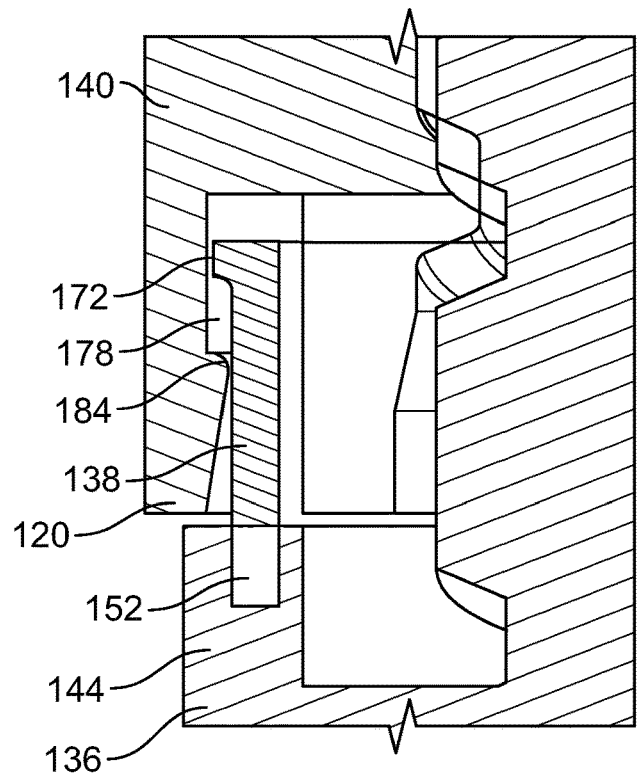
FIG. 9 is an inverted view of the separated cap and locking element shown in FIG. 8.

Referring to FIG. 8, a cross sectional view of the cap 136 after being separated from the locking element 138 is shown. When this occurs, the locking element 138 falls to the bottom of the second groove 178 due to gravity. In accordance with the present disclosure, a depth 190 of the second groove 178 is sized larger than a height 192 of the locking element 138 such that locking element 138 is within the second groove 178 and does not extend beyond the second groove 178. Since the locking element 138 is within the second groove 178, the locking element 138 cannot access or contact the cap 136. This prevents re-insertion of the locking element 138 back into the first groove 152 of the cap 136 if an attempt to reassemble cap assembly 134 is made by a user. FIG. 9 is an inverted view of the separated cap 136 and locking element 138 shown in FIG. 8. Turning the cap 136 and locking element 138 upside down in an attempt by a user to re-insert the locking element 138 back into the first groove 152 will also not be successful. In particular, the locking element 138 is pushed upward in the second groove 178 due to the size of the groove depth and thus the force needed for an interference fit cannot be generated. Further, the weight of the locking element alone is not sufficient to generate the force necessary for an interference fit.

Figure 10:
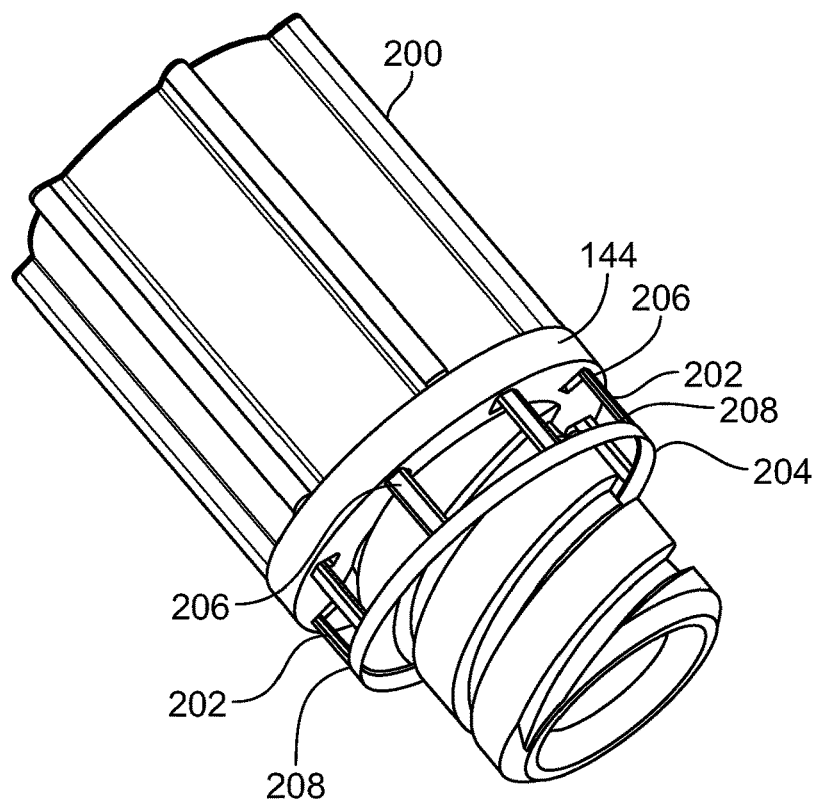
FIG. 10 is a side view an alternate embodiment of a cap.
Figure 11:
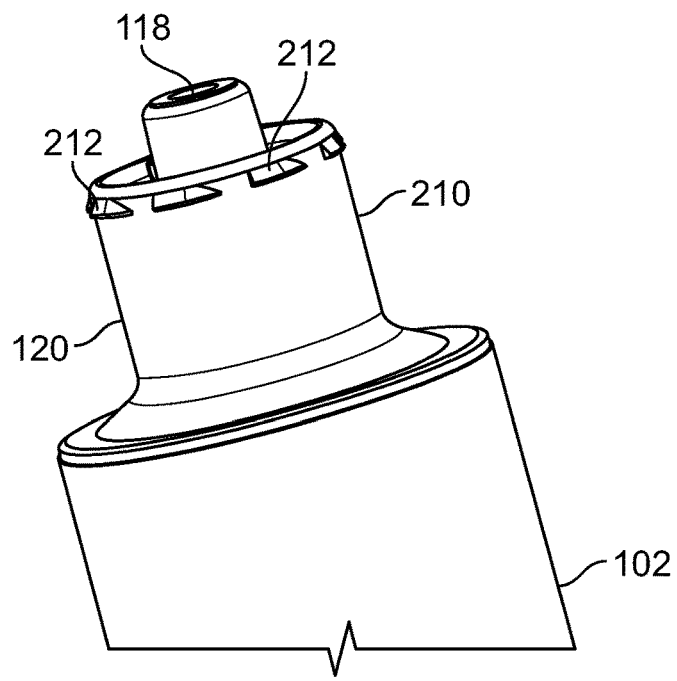
FIG. 11 is a side view of an alternate embodiment of an adapter section.

Referring to FIG. 10, a side view is shown of an alternate embodiment of a cap 200 in accordance with the present disclosure. In this embodiment, the cap 200 includes a plurality of spaced apart rod elements 202 located between the shoulder section 144 and a ring element 204. A first end 206 of each rod element 202 is attached to a periphery of the shoulder section 144. The ring element 204 is attached to a second end 208 of each rod element 202 opposite the first end 206. Referring to FIG. 11, a side view of an alternate embodiment of an adapter section 210 is shown. The outer wall 120 (see FIG. 1) includes a plurality of spaced apart projections or tab elements 212 located on an upper periphery of the outer wall 120. Each tab element 212 is configured to contact an associated rod element 202. In accordance with the present disclosure, the ring element 204 is used to indicate that the cap 200 was previously removed. In this embodiment, an inner surface 205 of the outer wall 120 includes internal threads 122 (see FIG. 12).

Figure 12:
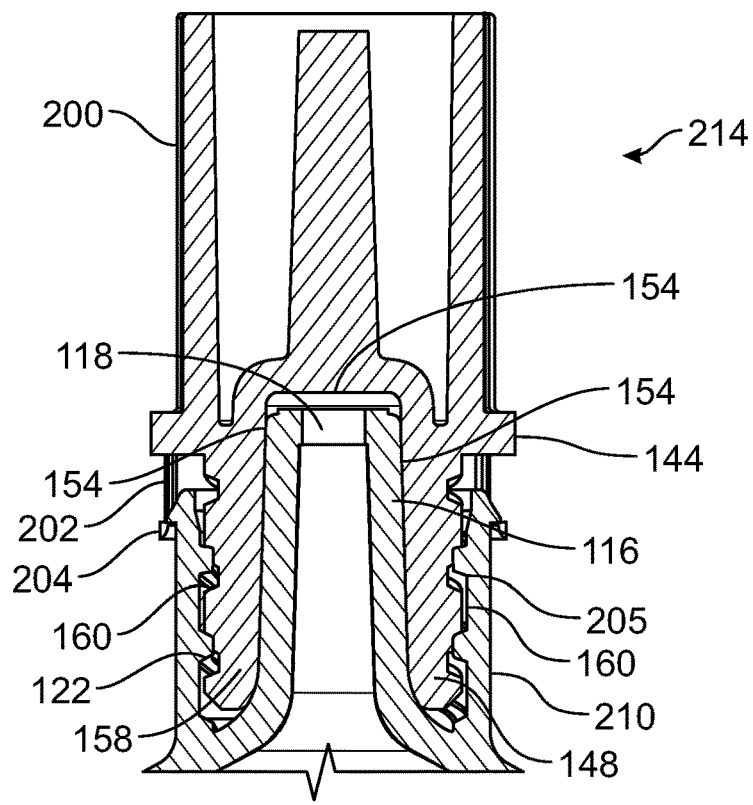
FIG. 12 is a cross sectional view of an alternate embodiment for a tamper evident cap assembly.
Figure 13:
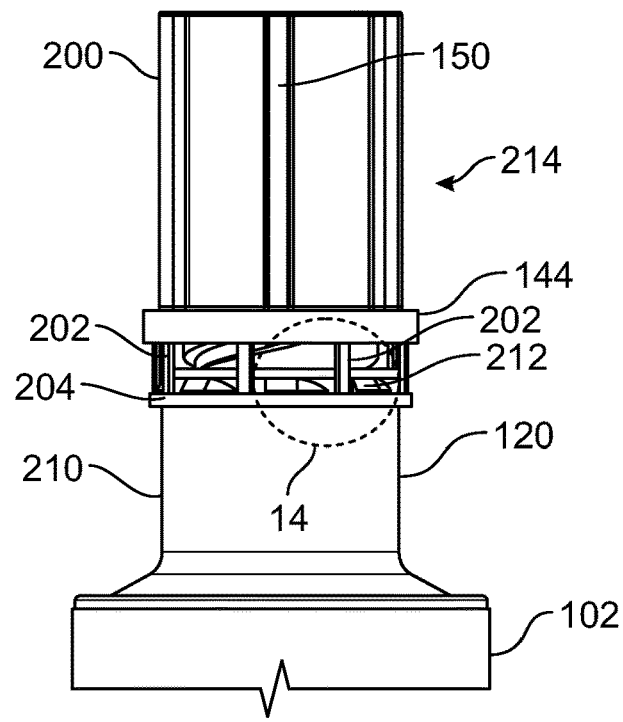
FIG. 13 is a side view of the alternate embodiment for a tamper evident cap assembly.

Referring to FIGS. 12 and 13, cross sectional and side views, respectively, are shown of an alternate embodiment for a tamper evident cap assembly 214. External threads 160 of attachment section 148 threadably engage the internal threads 122 of the outer wall 120. The internal walls 154 of the cap 200 enclose the barrel tip 116 and thus isolate or close off a portion of the barrel tip 116 and fluid passageway 118 from the environment so that they remain sterile and unadulterated prior to their desired administration. This enables the syringe 100 to be pre-filled, stored and/or transported with a predetermined amount of fluid disposed within the chamber 106.

Figure 14:
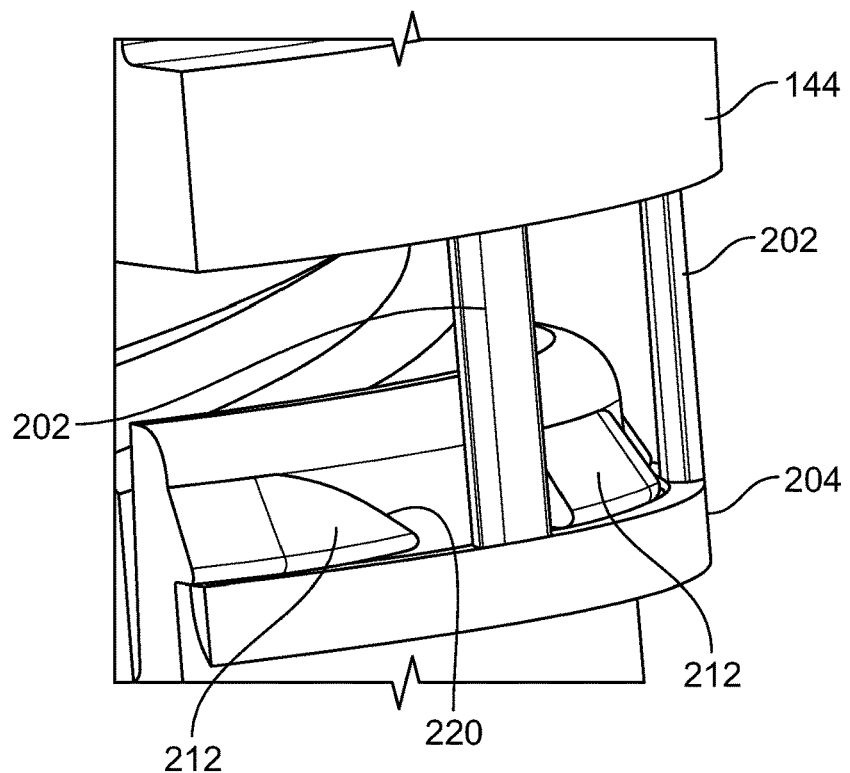
FIG. 14 is an enlarged view of balloon section 14 of FIG. 13 that depicts selected tab and rod elements of the alternate embodiment.
Figure 15:
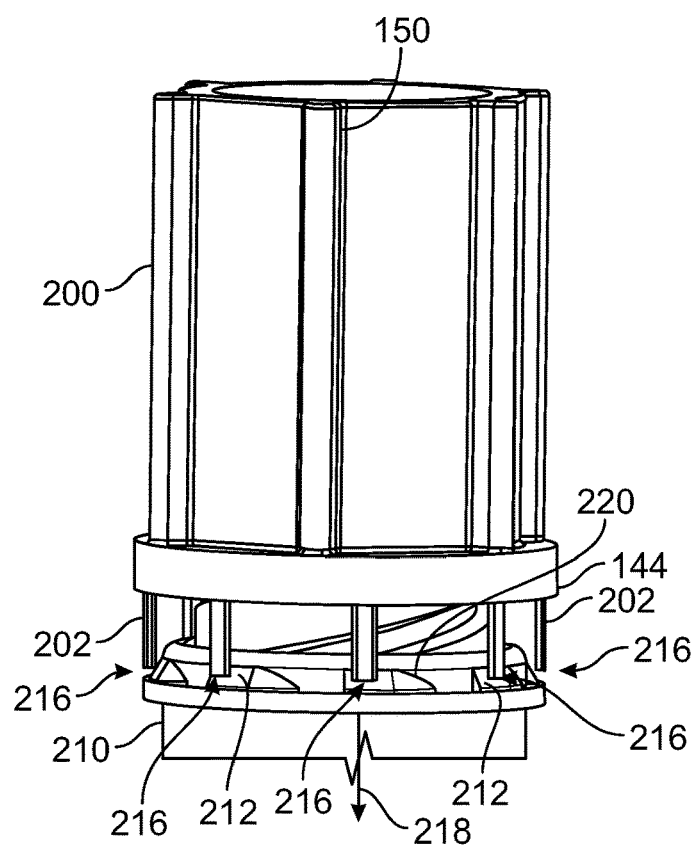
FIG. 15 illustrates a ring element of the alternate embodiment after being severed from the rod elements.

Referring to FIG. 14, an enlarged view of balloon section 14 of FIG. 13 is shown which depicts selected tab 212 and rod 202 elements. Each tab element 212 is located between a pair of rod elements 202. Each rod element 202 is frangible and configured to break upon contact with a tab element 212. In order to access the adapter section 210, a healthcare provider unscrews or rotates the cap 200. Rotation of the cap 200 causes corresponding rotation of the rod elements 202 such that each rod element 202 contacts an associated stationary tab element 212. Further rotation of the cap 200 causes each tab element 212 to break an associated rod element 202 thus severing the ring element 204 from each rod element 202. In one or more embodiments, each tab element 212 includes a sloped surface 220 that strikes an associated rod element 202 to facilitate severing of the rod element 202. Referring to FIG. 15, the ring element 204 is shown severed from rod elements 202 (see arrow 216) after the tab elements 212 contact and break the rod elements 202.

Figure 16:
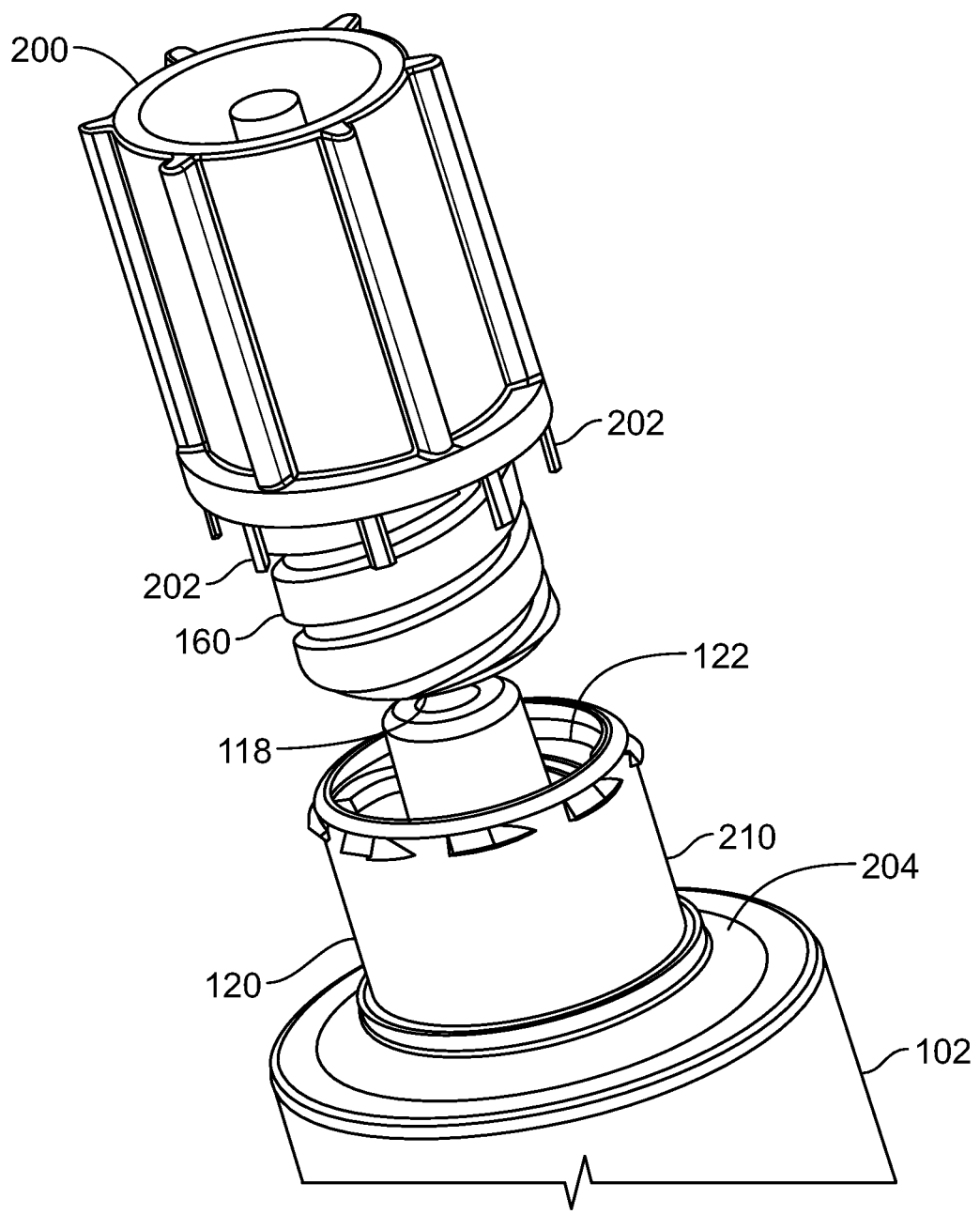
FIG. 16 illustrates the alternate cap after being removed from the adapter section and the severed ring element located on a barrel of syringe.

FIG. 16 shows the cap 200 removed from the adapter section 210 and the severed ring element 204 on the barrel 102 of syringe 100. When the rod elements 202 are broken, the ring element 204 falls by gravity (see arrow 218) onto the barrel 102. In accordance with the alternate embodiment of the present disclosure, presence of the ring element 204 on the barrel 102 of syringe 100 indicates that tampering of the syringe 100 or cap 200 previously occurred. Thus, sterility of the syringe 100 and its contents cannot be verified.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has provided a description with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents.

What is claimed is:

1. A syringe that provides evidence of tampering, comprising:

a syringe barrel having a chamber that holds a fluid;

an adapter section formed on the syringe barrel, the adapter section including outer and inner walls that form a first groove, wherein the inner wall includes barrel threads and the outer wall includes a first projection, the adapter section further including a fluid passageway that enables fluid communication with the chamber;

a moveable plunger having a plunger flange that moves forward within the chamber to decrease a volume of the chamber to cause the fluid to be forced out of the fluid passageway;

a cap having cap threads that threadably engage the barrel threads to removably attach the cap to the adapter section wherein the cap encloses the fluid passageway and wherein the cap further includes a second groove; and a locking element having a sidewall that includes a second projection, wherein the locking element is received by the first groove and wherein the locking element is removably attached to the cap by an interference fit between the sidewall and the second groove, wherein rotation of the cap causes upward movement of the cap that overcomes the interference fit between the cap and locking element thereby removing the cap from the adapter section and wherein the locking element is prevented from being removed from the first groove due to contact between the first and second projections wherein presence of the locking element in the first groove after the cap is removed provides evidence of tampering.

2. The syringe according to claim 1, wherein the locking element is ring shaped.

3. The syringe according to claim 1, wherein the first and second projections are wedge shaped.

4. The syringe according to claim 1, wherein the adapter section is transparent to enhance visibility of the locking element.

5. The syringe according to claim 1, wherein the outer wall of the adapter section is fabricated from a resilient material.

6. The syringe according to claim 1, wherein the cap includes a shoulder section located between an upwardly extending grip section and a downwardly extending attachment section, wherein the shoulder section includes the second groove and the attachment section includes the cap threads.

7. The syringe according to claim 6, wherein the cap threads are configured as external threads formed on the attachment section.

8. The syringe according to claim 1, wherein the barrel threads are configured as internal threads formed on the inner wall of the adapter section.

9. The syringe according to claim 1, wherein the cap includes internal walls that define a cavity that encloses the fluid passageway.

10. The syringe according to claim 1, wherein the fluid is a medicine, saline or a constituent of a medical treatment that is designed to be mixed with another constituent prior to administration to a patient.

11. A syringe that provides evidence of tampering, comprising:
a syringe barrel having a chamber that holds a fluid;
an adapter section formed on the syringe barrel, the adapter section including outer and inner walls that form a first groove, wherein the inner wall includes barrel threads and the outer wall includes a first projection, the adapter section further including a fluid passageway that enables fluid communication with the chamber;
a moveable plunger having a plunger flange that moves forward within the chamber to decrease a volume of the chamber to cause the fluid to be forced out of the fluid passageway;
a cap having cap threads that threadably engage the barrel threads to removably attach the cap to the adapter section wherein the cap encloses the fluid passageway and wherein the cap further includes a second groove; and
a locking element having a sidewall that includes a second projection, wherein the locking element is received by the first groove and wherein the locking element is removably attached to the cap by an interference fit between the sidewall and the second groove,
wherein rotation of the cap causes upward movement of the cap that overcomes the interference fit between the cap and locking element thereby removing the cap from the adapter section and wherein the locking element is prevented from being removed from the first groove due to contact between the first and second projections wherein presence of the locking element in the first groove after the cap is removed provides evidence of tampering and
wherein a depth of the first groove is larger than a height of the locking element such that the locking element does not extend beyond the first groove to inhibit re-insertion of the locking element back into the first groove after the cap is removed.

12. The syringe according to claim 11, wherein the locking element is ring shaped.

13. The syringe according to claim 11, wherein the first and second projections are wedge shaped.

14. The syringe according to claim 11, wherein the adapter section is transparent to enhance visibility of the locking element.

15. The syringe according to claim 11, wherein the outer wall of the adapter section is fabricated from a resilient material.

16. The syringe according to claim 11, wherein the cap includes a shoulder section located between an upwardly extending grip section and a downwardly extending attachment section, wherein the shoulder section includes the second groove and the attachment section includes the cap threads.

17. The syringe according to claim 16, wherein the cap threads are configured as external threads formed on the attachment section.

18. The syringe according to claim 11, wherein the barrel threads are configured as internal threads formed on the inner wall of the adapter section.

19. The syringe according to claim 11, wherein the fluid is a medicine, saline or a constituent of a medical treatment that is designed to be mixed with another constituent prior to administration to the patient.

20. A method of detecting tampering of a syringe, the method comprising:
providing a syringe barrel having a chamber that holds a fluid;
providing an adapter section on the syringe barrel, the adapter section including outer and inner walls that form a first groove, wherein the inner wall includes barrel threads and the outer wall includes a first projection, the adapter section further including a fluid passageway that enables fluid communication with the chamber;
providing a moveable plunger having a plunger flange that moves forward within the chamber to decrease a volume of the chamber to cause the fluid to be forced out of the fluid passageway;
providing a cap having cap threads that threadably engage the barrel threads to removably attach the cap to the adapter section wherein the cap encloses the fluid passageway and wherein the cap further includes a second groove; and
providing a locking element having a sidewall that includes a second projection, wherein the locking element is received by the first groove;
forming an interference fit between the sidewall and the second groove to removably attached the cap;
providing upward movement of the cap to overcome the interference fit between the cap and locking element thereby removing the cap from the adapter section;
providing contact between the first and second projections during upward movement of the cap; and
preventing removal of the locking element from the first groove due to contact between the first and second projections wherein presence of the locking element in the first groove after the cap is removed provides evidence of tampering.

* * * * *